Dec. 11, 1928.                                                              1,694,436
C. F. BAUER
COOLING AND DISPENSING MACHINE
Filed Jan. 17, 1927                4 Sheets-Sheet 1
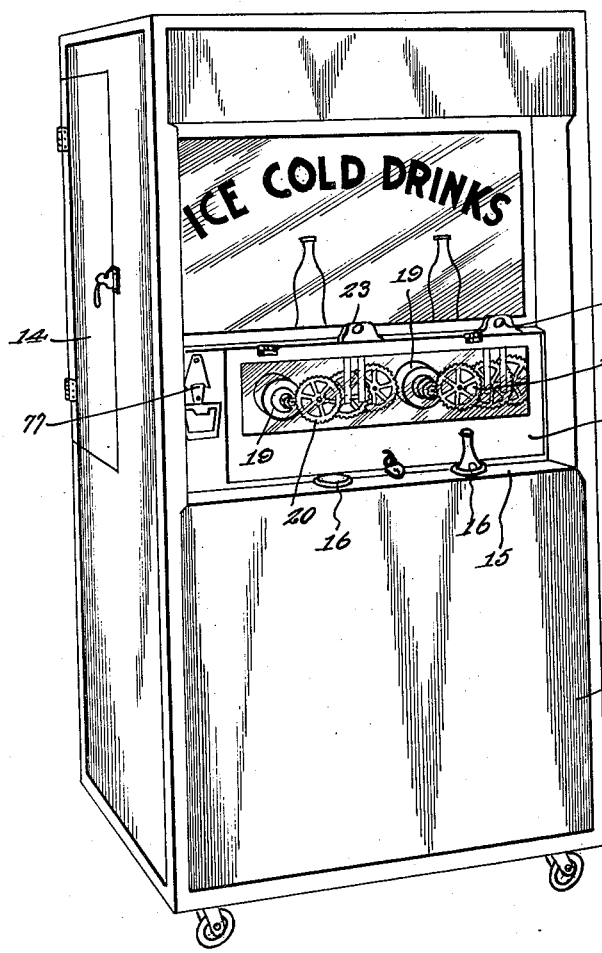
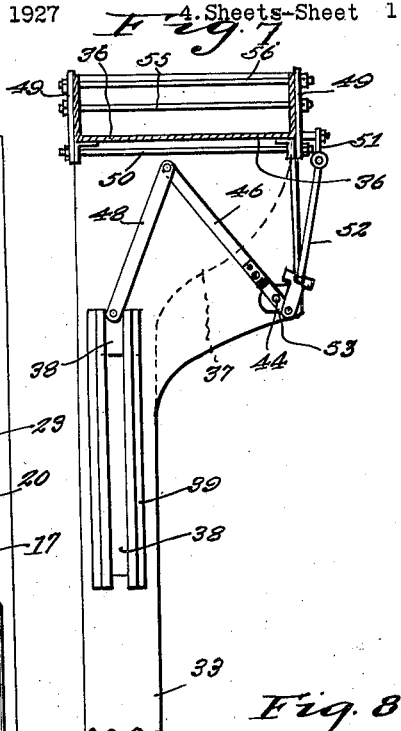
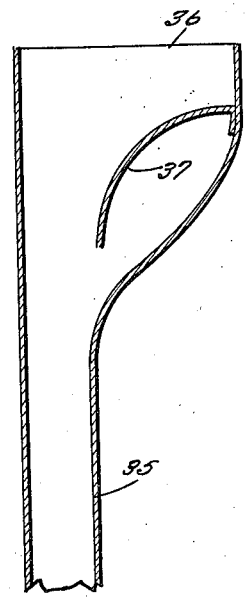
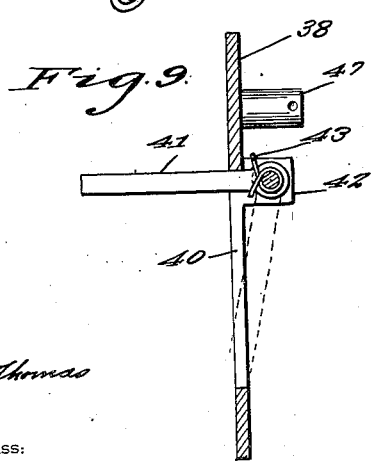
C. F. Bauer INVENTOR Dec. 11, 1928.

C. F. BAUER 1,694,436

COOLING AND DISPENSING MACHINE

Filed Jan. 17, 1927 4 Sheets-Sheet 2

C. F. Bauer INVENTOR
BY Victor J. Evans
ATTORNEY

Dec. 11, 1928.
C. F. BAUER
1,694,436
COOLING AND DISPENSING MACHINE
Filed Jan. 17, 1927
4 Sheets-Sheet 3
Fig.3.
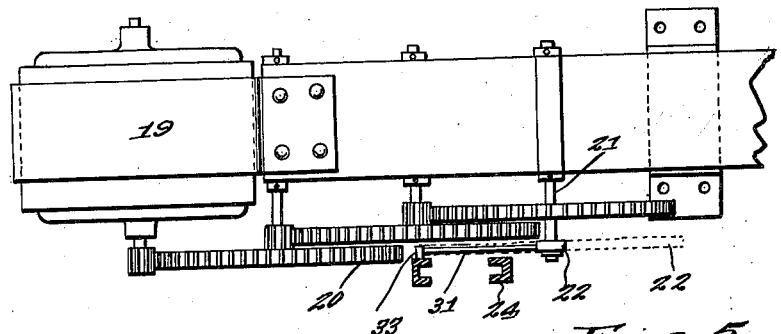
Fig.4.
Fig.5.
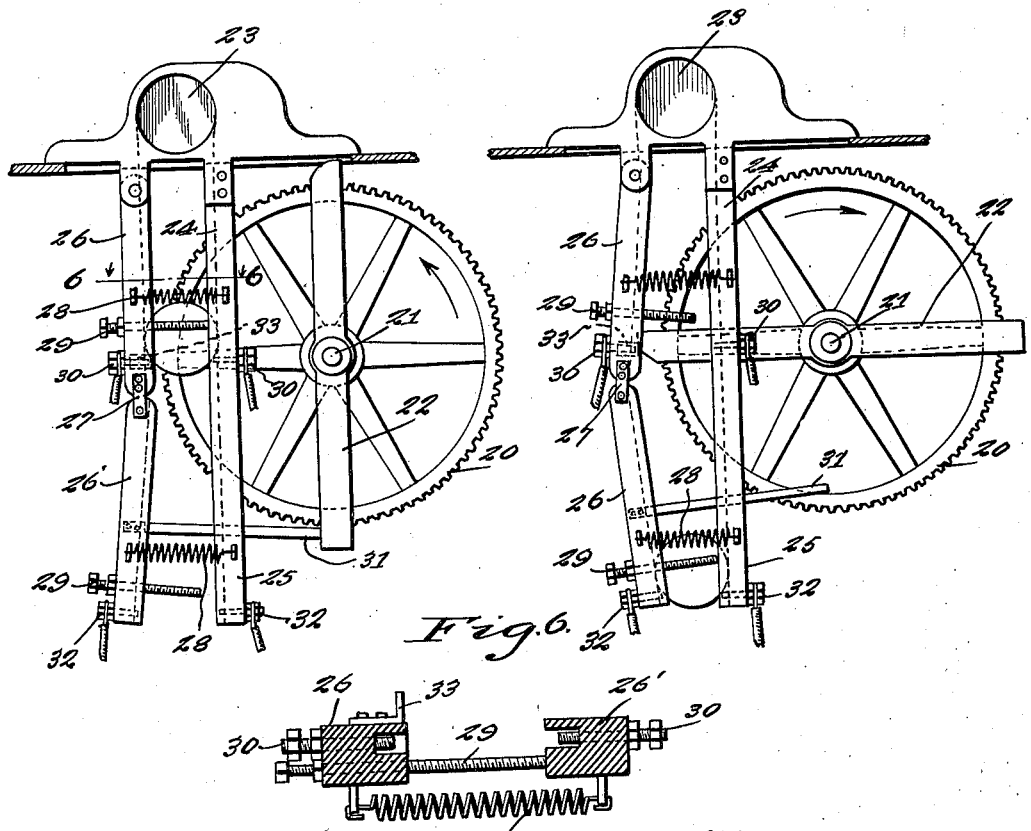

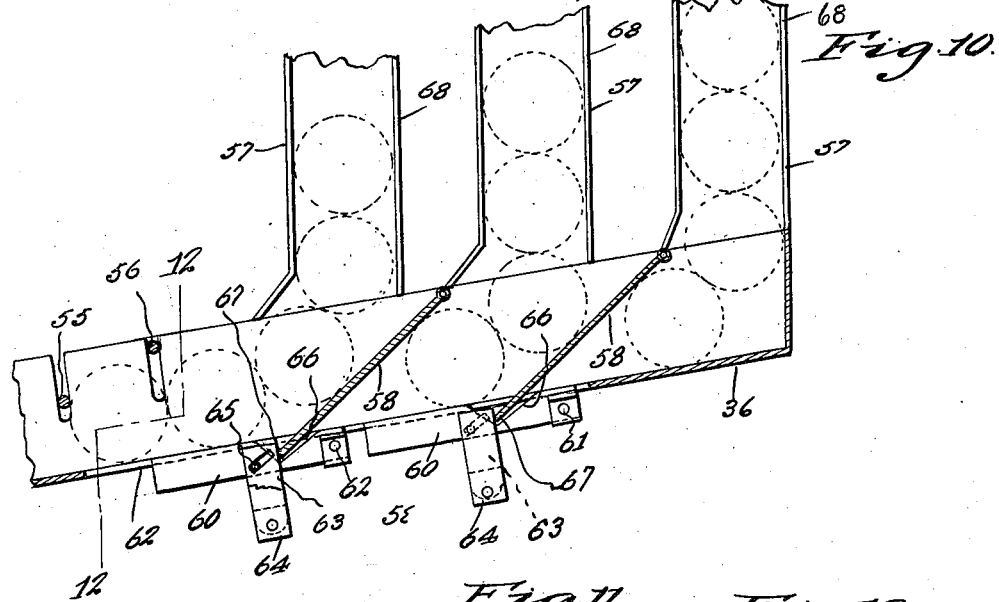
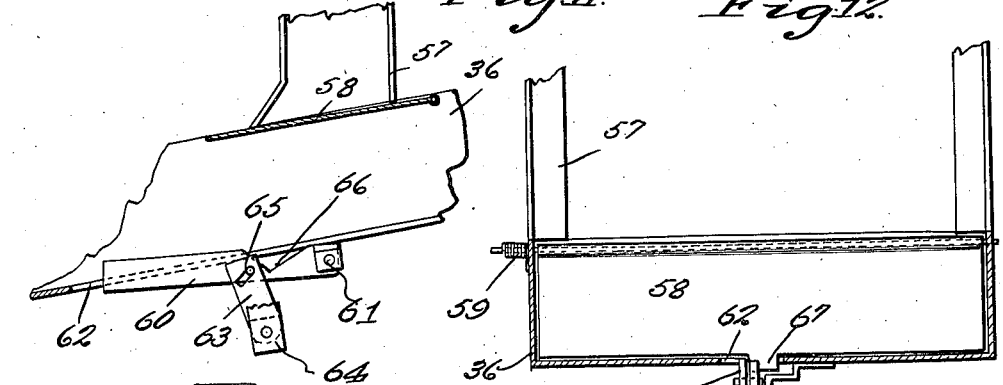
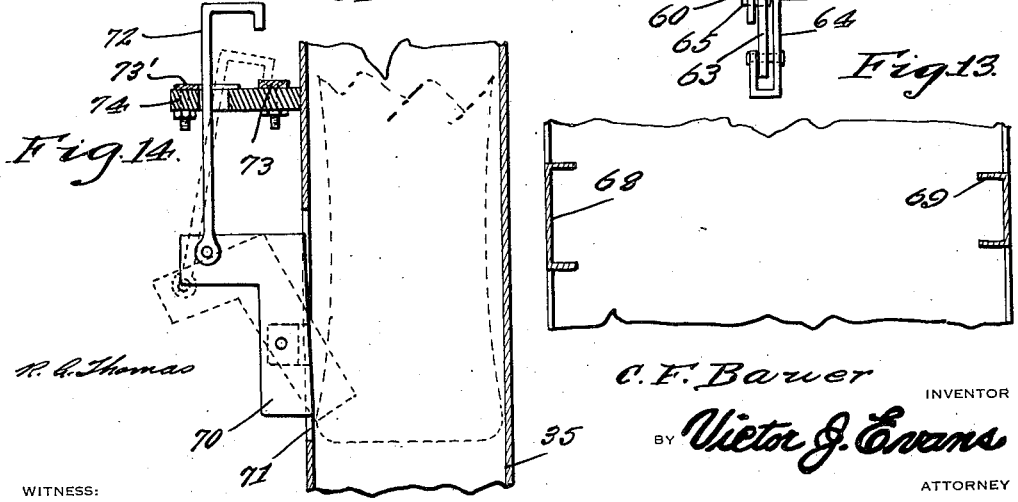

Patented Dec. 11, 1928.

1,694,436

UNITED STATES PATENT OFFICE.

CHARLES F. BAUER, OF LOUISVILLE, KENTUCKY.

COOLING AND DISPENSING MACHINE.

Application filed January 17, 1927. Serial No. 161,616.

This invention comprehends the provision of a cooling and dispensing machine for bottled goods, and from which the bottles are adapted to be singly ejected by mechanism operated through the instrumentality of an electric motor.

In carrying out my invention, I contemplate the provision of means whereby a coin inserted into a coin slot formed in the machine will close the circuit of the motor to bring the mechanism into operation.

The invention embodies amongst other features a curved dispensing tube into which the bottles are fed by gravity from a suitable rack disposed above the tube, each bottle being tilted from a normally horizontal position to a vertical position as it enters the tube, so that the bottles are ejected in a standing or upright position, whereby they can be conveniently taken hold of by the user.

Another object of the invention resides in the provision of means actuated by the mechanism above mentioned, which regulates the feed of the bottles from the rack into the tube, the latter being supplied with a bottle from the rack every time a bottle is ejected from the machine.

A further object of the invention resides in the provision of a switch included in a normally open circuit with an alarm or signal and automatically operable to close the circuit when the machine is emptied.

Another object of the invention is to provide an ice chamber in the casing forming the body of the device through which the tube passes so that the contents of the bottles will be cooled before the bottles pass from the machine.

This invention also consists in certain other features of construction and in the combination and arrangement of the several parts, to be hereinafter fully described, illustrated in the accompanying drawings and specifically pointed out in the appended claims.

In describing my invention in detail, reference will be had to the accompanying drawings wherein like characters denote like or corresponding parts throughout the several views, and in which:—

Figure 1 is a perspective view of the apparatus, constructed with two units for dispensing two different kinds of beverages.

Figure 3 is a plan view of the motor and its gearings for operating the switch mechanism, a portion of the coin chute being shown in section.

Figure 4 is a side view of the switch means and the gearing carrying the switch operating arm.

Figure 5 is a similar view but showing the parts in a different position.

Figure 6 is a section on line 6—6 of Figure 4.

Figure 7 is a section on line 7—7 of Figure 2.

Figure 8 is a section on line 8—8 of Figure 2.

Figure 9 is a sectional view through the slide and its spring finger for pushing the bottles through the chute or tube.

Figure 10 is an enlarged sectional view through portions of the rack and the chute for receiving the bottles from the rack.

Figure 11 is a fragmentary view of the portions shown in Figure 10, with the parts shown in a different position.

Figure 12 is a section on line 12—12 of Figure 10.

Figure 13 is a section on line 13—13 of Figure 2.

Figure 14 is a section on line 14—14 of Figure 2.

Figure 2:
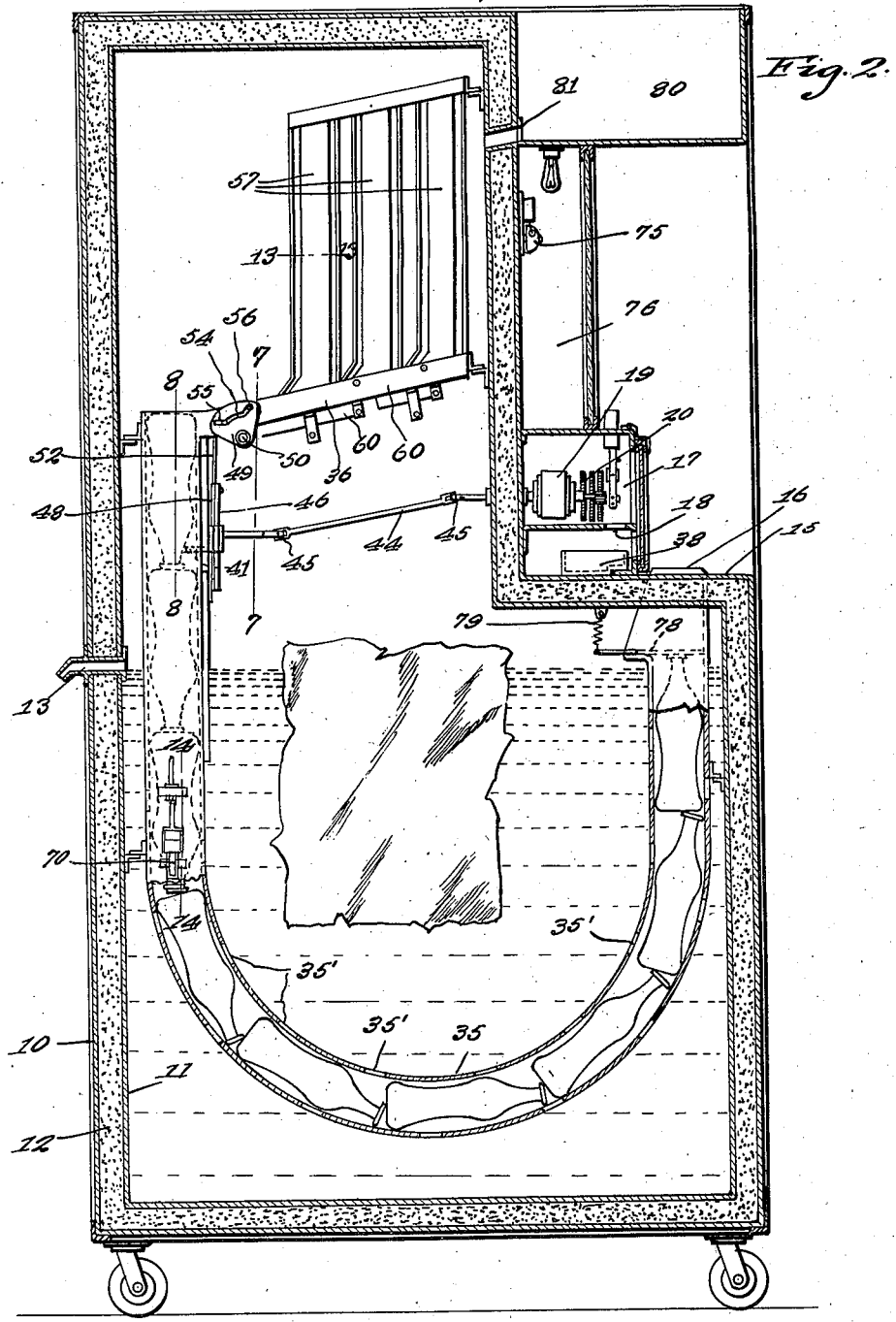
Figure 2 is a vertical sectional view through the apparatus.

The machine forming the subject matter of the present invention comprises a cabinet which may be constructed from any suitable material and vary in size and shape without departing from the spirit of the invention. This cabinet is preferably constructed of spaced inner and outer walls 10 and 11 respectively, between which is arranged insulating material 12 of any suitable character. The lower portion of the cabinet is adapted to contain ice or some other cooling agent, an overflow pipe 13 being arranged as shown in Figure 2 to keep the level of the ice water or other cooling agent at a predetermined level. A door 14 is arranged at one side of the cabinet to permit access being had to the bottle supporting rack, while another door, arranged at any appropriate part of the cabinet, can be provided to permit access being had to the ice chamber, or this same door may be used for both purposes.

As shown in Figure 1, the cabinet is provided with two units, one unit being arranged to handle bottles containing a certain beverage and the other unit bottles containing another beverage. Of course, it will be understood that other units may be added as desired. A shelf 15 is formed on the cabinet at the front thereof and a pair of outlet holes 16 pass through the shelf, one for each unit, through which the bottles pass and from which they can be taken by the customer. A casing 17 is arranged on the rear part of the shelf which is divided by the partition 18 into two chambers and I prefer to make the front of this casing transparent as shown. A pair of motors 19 is arranged in the upper chamber, said motors being of the reversible type, each motor being arranged to operate one of the units. Each motor drives a train of gears 20 to rock a shaft 21 to which the last gear of the train is connected. This shaft carries a switch operating arm 22.

A pair of coin slots 23 is arranged in the top of the casing 16, one for each unit and each slot conducts the coin between the combined guiding and switch means 24 which depend into the casing. Such means comprises a stationary member 25 and a sectional member 26 and 26', the upper section being pivoted to the slot carrying part and the two sections being connected together by the links 27 so that they have movement one upon the other. Springs 28 connect the sections with the stationary member 25 and these springs tend to pull the sections toward the member 25, but this movement is limited by the long set screws 29 which are carried by the sections. In the normal position of the parts, the section 26 is parallel with the stationary member so that a coin can drop from the slot to the groove in the member 25 and the top section 26 until it strikes the contacts 30, one of which is carried by the member 25 and the other by the section 26. The contacts are preferably made adjustable and they will be bridged by the coin so that a circuit to the motor will be closed by the coin and thus the motor will begin to operate.

A bar 31 is carried by the section 26' and is normally engaged by the lower end of the arm 22 which holds the menber 26' with its lower end farther away from the member 25 than its upper end, so that a coin can pass between the members 25 and 26' without engaging the contacts 32 which are arranged at the lower ends of said members 25 and 26'. When the motor begins to operate, the arm 22 leaves the rod 31 so that the section 26' will move toward the member 25 until its set screw 29 strikes said member 25. The contact 32 will then be in a position to catch and hold a coin dropping down between the two members. However, the coin remains held between the contacts 30 until the arm 22 is turned to a position where it will strike a bracket 33 on the section 26 so as to force the section outwardly, as shown in Figure 5, which will permit the coin to pass between the contacts 30 and drop upon the contacts 32. This will break one circuit of a motor and close the second circuit thereof so that the motor will be reversed and thus cause the arm 22 to return to its normal position. At this point, the arm will strike the rod 31 which will force the section 26' away from the member 25 so that the coin will be released and it will drop through a slot in a tray 34 in the second chamber of the casing 17. The switch means will then be in a position to receive another coin and it will be seen that the arm 22 and its gear is operated first a quarter turn in one direction and then it is rotated a quarter turn in the opposite direction.

A substantially U-shaped tube or chute 35 is placed in the cabinet with its discharge end under an opening 16 and its receiving end placed to receive bottles from an inclined chute 36 placed in the upper part of the cabinet. As will be seen, the tube 35 has its major portion in the ice chamber and it may be provided with perforations 25' so that some of the ice water can enter the tube. The bottom of the chute 36, at its junction with the tube 35, is curved downwardly, as shown at 37 in Figure 8, so that as the bottles roll down the chute in a horizontal position, as they strike the curved part 37 of the bottom of the chute, they will be turned to a vertical position with their bottoms up and thus they will be discharged from the chute with their tops up so that the customer can grasp the top of the bottle and pull it through the opening 16.

A plate 38 is vertically movable in the guideways 39 placed on the inlet end of the tube 35 and this plate has a slot 40 therein and carries a finger 41 which is pivoted between the ears 42 on the plate which are arranged adjacent the upper end of the slot so that when the finger 41 is in horizontal position, it will engage the top of the slot so that further upward movement of the finger is prevented. A spring 43 tends to hold the finger in this position. The slot 40 is long enough to permit the finger to be pressed downwardly into the dotted line position shown in Figure 9. When this plate 38 is pressed downwardly, the finger will engage a bottom of a bottle and thus force this bottle and the other bottles in front of one engaged by the finger through the tube 35 and thus project the top part of the first bottle in the chute through the opening 16. As the plate 38 moves back to its normal position, the arm 41 will strike the next bottle to the one just engaged by the finger and thus the finger will be forced downwardly into the dotted line position shown in Figure 9 so that it can pass this bottle and then its spring will force the finger outwardly again so that it will engage the bottom of this bottle on the next downward movement of the plate. Thus the bottles are moved to the discharge opening one at a time. This plate is adapted to be actuated from the motor through means of the sectional shaft 44, the sections of which are connected together by universal joints 45 and the arm 46 which is connected with one end of the shaft and which is connected with a stud 47 on the plate by a link 48.

A pair of segmental plates 49 is arranged one at each side of the chute 36 and these plates are connected together by a rod 50 so that they will move in unison. One end of the rod has a short arm 51 thereon which is connected by a link 52 with a projecting part 53 of the arm 46 so that as the arm 46 moves downwardly, the link 52 moves upwardly to rock the rod 50 and the plates 49. Each plate is provided with a cam slot 54 which consists of an arc-shaped center portion concentric with the pivotal point of the plate and inclined end portions. A pair of rods 55 and 56 have their ends fitting in these slots and these rods pass across the chute and are adapted to engage the bottles passing through the chute. As will be seen, these parts are so arranged that when the rod 55 is engaging one bottle to prevent the same from rolling down the chute into the tube, the other rod 56 will be in raised position out of contact with the two bottles, as shown in Figure 10. Then as the parts are operated again, the rod 55 will raise and the rod 56 will be lowered so that one of the bottles will be released while the other bottle will be held by the rod 56. Thus a bottle can pass from the chute into the tube, while the bottles in the tube are being forced along the same by the parts before described and then on the return movement of the parts, the rod 56 will be raised and the rod 55 will be lowered so that another bottle will move down the chute and rest against the rod 55. Thus the bottles in the chute are given a step by step movement the same as the bottles in the tube.

A number of vertical racks 57 are arranged in the top part of the cabinet with their lower ends in communication with the chute so that bottles placed in the rack will gravitate into the chute. Gates 58 prevent the bottles in the rear racks from passing down the chute until all the bottles have been fed from the first rack. The gates are provided with springs 59 which tend to hold them in raised position, but each gate is normally held in lowered position by means of a lever 60 pivoted at 61 to a bottom part of the chute and having its forward part projecting into the chute through a slot 62 formed in the bottom thereof, the lever being connected to a pivoted latch member 63, which is pivoted to a bracket 64 fastened to the bottom of the chute, by a pin and slot connection 65. Each lever is provided with a notch 66 to receive a tongue 67 on the lower edge of each gate.

As will be seen from Figures 10, 11 and 12, the bottles in the chute, resting upon the lever 60, will hold the same in its lowered position and as the lever moves downwardly, the pin therein engaging the bottom of the inclined slot in the latch member will cause the said latch member to move forwardly and engage the tongue of the gate and thus hold the same in lowered position. When all of the bottles have moved out of one rack and down the chute so that the lever 60 can raise, the latch member will be moved away from the tongue so that the gate can raise, its springs 59 acting to raise the lever 60 and the gate, as shown in Figure 11. Then the bottles in the next rack will pass down the chute. Then when this second rack is emptied, the next gate will raise so that the bottles can pass from the third rack. As shown in Figure 13, each rack has its side 68 wider than the side 69 so that the bottoms of the bottles can engage the side 68 while their mouths engage the side 69. When the racks are all emptied and the last bottle passes below the angle lever 70 which is pivoted to the tube 35 and which is arranged in a slot 71 in the tube, said lever will tilt under the action of gravity and thus bring a hooked rod 72 which is pivoted thereto, against a contact 73 on a guiding member 74 for the rod 72 so as to close a circuit to an alarm 75, which will indicate that the cabinet needs refilling with bottles. The guide 74 carries a second contact 73' with which the rod 72 is always in engagement, it being understood that the contact 73 is insulated from the guiding member or the guiding member itself may be formed of insulating material.

A second casing 76 may be arranged above the casing 17 for containing samples of the bottles being dispensed by the units so that the customer can see the kind of beverage he is buying and I may also place a cap remover 77 on the cabinet whereby the caps can be removed from the bottles dispensed thereby.

Arranged within the tube 35, adjacent its discharge end, is a normally closed pivoted cover 78 which is held in this position by a spring 79, to prevent a tool or instrument of any kind being inserted within the tube in an effort to fraudulently obtain a bottle therefrom. The cover is opened by the bottle being ejected, and as it passes the cover, the latter is automatically closed by the spring 79.

A chamber 80 is arranged at the top of the cabinet for receiving empty bottles, and liquid flowing from the bottles placed in this chamber will pass into the ice chamber through the passage 81.

From the foregoing it will be seen that it is simply necessary to drop a coin into the apparatus to cause the motor operated means to deliver a bottle at the discharge opening, where the customer can take it from the apparatus and as the bottles pass through an ice chamber in the cabinet, their contents will be cold. It will also be seen that I have provided means for controlling the passage of a bottle from the chute into the tube 35 and also means for forcing the bottles step by step through said tube 35. Means are also provided for preventing the bottles of the rear racks from being fed into the chute until the first rack is emptied, such means coming into action automatically as soon as the preceding rack is emptied.

The cabinet may be placed on rollers, as shown in the drawings, if desired.

It is thought from the foregoing description that the advantages and novel features of my invention will be readily apparent.

I desire it to be understood that I may make changes in the construction and in the combination and arrangement of the several parts, provided that such changes fall within the scope of the appended claims.

What I claim is:—

1. In a cooling and dispensing machine for bottled goods, a cabinet including a cooling chamber, a bottle dispensing tube arranged in said chamber and adapted to contain bottles in end to end relation, the outlet end of said tube passing through a wall of the cabinet, means for singly ejecting the bottles from said tube, and a normally closed pivoted cover for said tube and adapted to be opened by the bottle being projected, said cover being spaced an appreciable distance from the outlet end of said tube to prevent bottles being taken from the cabinet.

2. In a cooling and dispensing machine for bottled goods, a cabinet including a cooling chamber, a curved bottle dispensing tube arranged within the cabinet and adapted to contain bottles in end to end relation, means for singly ejecting said bottles from one end of the tube, a bottle rack arranged above the tube and adapted to support a plurality of bottles horizontally, said bottles being adapted to gravitate in the direction of the adjacent end of the tube, means operable simultaneously with the ejecting means to supply said tube with a single bottle from the rack during each operation of the machine, and means for tilting said bottle from a horizontal to a vertical position as it enters the tube.

3. In a cooling and dispensing machine for bottled goods, a cabinet including a cooling chamber, a substantially U-shaped bottle dispensing tube arranged in said chamber and adapted to contain bottles in end to end relation, motor driven means for singly ejecting said bottles from one end of the tube and including a slide mounted on said tube adjacent one end thereof, said tube having a slot, an ejecting finger projecting through said slot and carried by the slide and arranged to engage and move said bottles through the tube to eject one of said bottles therefrom and resilient means for permitting the finger to fold to pass a bottle on the return movement of the slide.

4. In a cooling and dispensing machine for bottled goods, a cabinet including a cooling chamber, a curved bottle dispensing tube arranged in said chamber and adapted to contain bottles in end to end relation, said tube having a slot adjacent one end thereof, a slide mounted on said tube, an ejecting finger pivoted on said slide, a spring for normally holding said finger horizontally within said tube to engage the adjacent bottle therein, motor driven means for operating the slide whereby the bottles are forced through the tube by said finger to singly eject a bottle from one end of the tube when the slide is moved in one direction and on the return movement of the slide, said finger being moved downwardly against the action of its spring as it contacts with the bottle until it passes the bottle, when the spring returns it to its horizontal position, a rack arranged in the upper portion of the cabinet and adapted to support a plurality of bottles, and means operated by the motor driven means for supplying the adjacent end of the tube with a bottle from said rack during each operation of the machine.

5. In a cooling and dispensing machine for bottled goods, a cabinet including a cooling chamber, a bottle dispensing tube arranged in said chamber and adapted to contain bottles in end to end relation, a chute for delivering bottles to the inlet end of the tube, means for forcing bottles through the tube, means for controlling the movement of the bottles from the chute into the tube, and a motor for operating both of such means.

6. In a cooling and dispensing machine for bottled goods, a cabinet including a cooling chamber, a bottle dispensing tube arranged in said chamber and adapted to contain bottles in end to end relation, a chute for delivering bottles to the inlet end of the tube, means for forcing bottles through the tube, means for controlling the movement of the bottles from the chute into the tube, a motor for operating both of such means, vertical racks for supporting bottles above the chute, said bottles passing from the racks to the chute by gravity, gates in the chute, for preventing bottles passing from the rear racks into the lower part of the chute and means for moving the gates to open position as soon as a rack in front of the rack provided with the gate is empty.

In testimony whereof I affix my signature.

CHARLES F. BAUER.